United States Patent Office

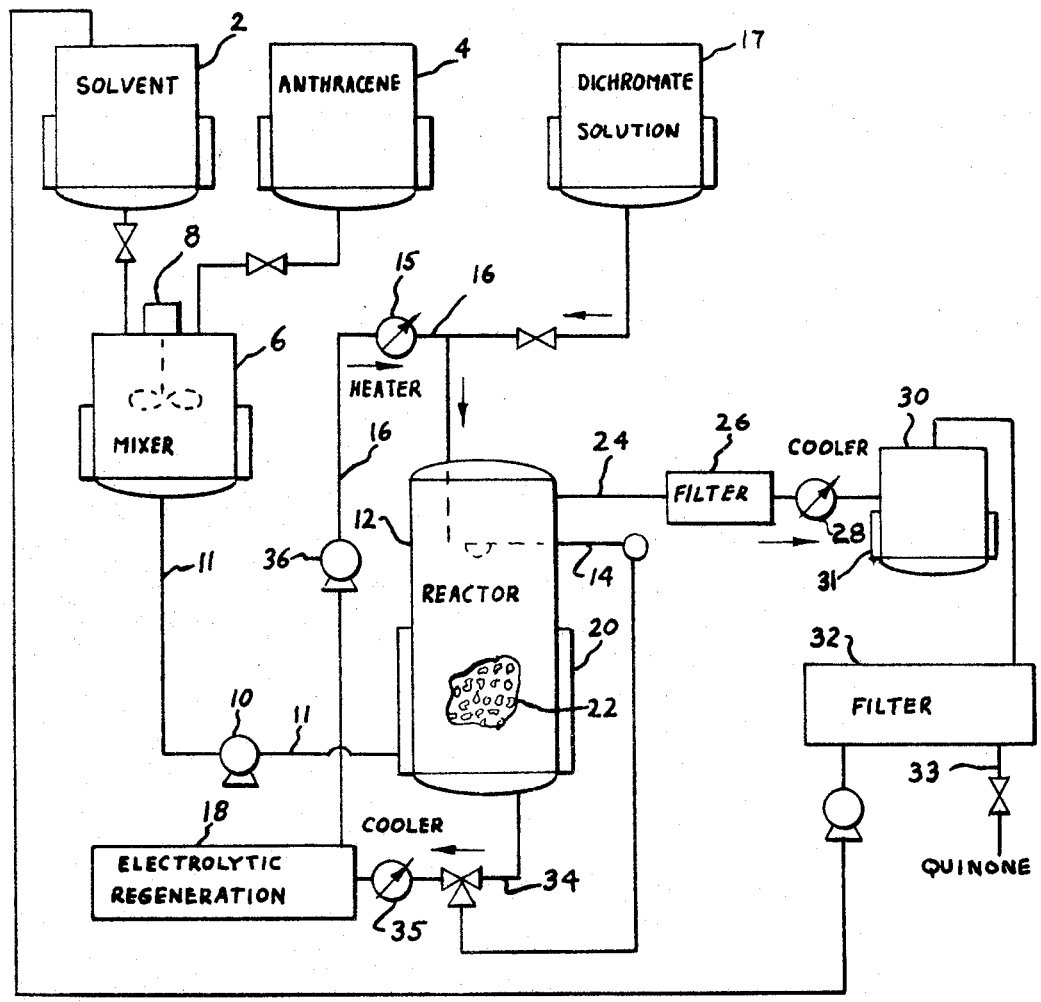

3,510,498
Patented May 5, 1970

---

3,510,498
OXIDATION OF FUSED RING HYDROCARBONS
Le Roi E. Hutchings, Johnson City, Tenn., assignor to
Great Lakes Carbon Corporation, New York, N.Y., a
corporation of Delaware
Filed June 21, 1965, Ser. No. 465,458
Int. Cl. C07c *49/66, 49/68, 49/72*
U.S. Cl. 260—385                11 Claims

---

ABSTRACT OF THE DISCLOSURE

In the oxidation of fused ring hydrocarbons to form quinones an effective method involves the use of a solution of a $Cr^{6+}$ compound as the oxidizing agent. This process does not lend itself to continuous operation because the chromium compound necessarily is in aqueous solution whereas the fused ring hydrocarbon is in an organic medium. Differences in densities are utilized herein in a process which can be operated continuously.

---

This invention in one of its aspects relates to the oxidation of polynuclear aromatic hydrocarbons. In a more specific aspect the invention pertains to a continuous process for the oxidation of fused ring hydrocarbons.

An effective method for the oxidation of fused ring hydrocarbons involves the use of a solution of a $Cr^{6+}$ compound as the oxidizing agent such as potassium dichromate, $CrO_3$ being formed, and the reduction of $Cr^{6+}$ to $Cr^{3+}$ occurring during the oxidation. In the oxidation by the usual $CrO_3$ process, a solution or slurry of the fused ring hydrocarbon is mixed with an aqueous solution of the chromium compound at the temperature of the reaction. The resulting quinone is separated from the liquid medium.

One of the advantages of chromic acid oxidation reactions as employed herein is the $Cr^{3+}$ resulting from the chemical oxidation can be electrolytically regenerated to be reused in the mechanism of the reaction. One of the disadvantages of the process is that it does not readily lend itself to continuous operation. There are several reasons for this. First, due to their respective solubilities, the chromium compound necessarily is in aqueous solution, whereas the fused ring hydrocarbon is in an organic medium. This difference in solubilities presents a control problem which stands in the way of continuous operation.

Another and perhaps greater barrier to continuous operation is that of producing only the desired product in view of the exothermic nature of the reaction. Even in the known batch process the sodium dichromate, or chromic acid, is added slowly to a slurry of anthracene crystals in suspension in diluted sulfuric acid to prevent excessive oxidation and heat buildup due to the exothermic nature of the reaction.

Batch type processes generally have been abandoned for other methods which can be adapted to continuous operation. With anthracene oxidation using chromic acid this has been the case. In U.S. 2,821,534 the difficulties of batch type oxidation of anthracene are described and a continuous process is provided for the oxidation of an anthracene to anthraquinone. In the process of U.S. 2,821,534, nitric acid is used as the oxidizing material and flow into the reactor is concurrent. The saturated solution of anthracene and the nitric acid solution are brought together into intimate contact with each other by vigorous agitation. While this process overcomes most of the problems of batch type operation it does not depend upon solution of all materials. The product stream is a slurry. In addition, constant agitation in a continuous reactor renders control of the process more difficult. Disadvantages in slurry processes such as this, and other prior art slurry processes, are centered in wetting problems. Where the fused ring hydrocarbon is in particle form it is virtually impossible to attain complete conversion. Oxidation occurs on the particle surface, tending to leave an unoxidized center. The result is that unreacted anthracene or phenanthrene must be separated from its quinone to form a usable product. Due to sublimation this is not an easy separation.

According to the practice of this invention a process is provided for the oxidation of polynuclear aromatic compounds having at least two fused rings. This process not only can be operated continuously, but it permits the use of $CrO_3$. By $CrO_3$ is meant chromium trioxide itself or the other chromium compounds generally employed as oxidizing agents for fused ring hydrocarbons, for example, potassium dichromate, sodium dichromate, chromic acid, sodium chromate, potassium chromate, and the like, in admixture with sulfuric, acetic acid, or admixture thereof. Polynuclear aromatic compounds having at least two fused rings are those hydrocarbons which form quinones on oxidation, for example anthracene, phenanthrene, naphthalene, chrysene, benzanthracene and their substitution products whose substituents resist oxidation. Examples are halo, nitro, sulfono, and alkyl naphthalene, anthracene, and phenanthrene compounds having less than five carbon atoms in the alkyl group. These anthracene and phenanthrene compounds must have the 9,10-positions available for the oxidation, for instance, 1-methylphenanthrene, 4-butylphenanthrene, 2-propylanthracene, 1,2-dimethylanthracene, 1,4 - diethylanthracene, 1 - sulfonoanthracene, 2 - bromophenanthrene, 1,2 - dichloroanthracene, 2-methylnaphthalene, 2,6-dimethylnaphthalene and the like. It has been found that where organic solubilities are based on the quinone product rather than fused ring hydrocarbon feed the process of passing one solution through the other lends itself effectively to an efficient continuous process. The invention thus contemplates continuously bringing a solution of the fused ring hydrocarbon, dissolved in a liquid organic solvent which resists oxidation, into countercurrent flow with an oxidizing solution consisting essentially of an aqueous dilute acid solution containing $CrO_3$, passing one solution through the other solution by virtue of their different densities, oxidation occurring during this passage, continuously adding hydrocarbon solution and fresh chromic acid solutions for the oxidation of hydrocarbon while continuously removing partially spent oxidizing solution for regeneration, and continuously removing organic solvent containing the quinone in solution therein for quinone recovery. The molar quantity of anthracene dissolved in the organic solvent is generally equal to the maximum molar quantity of the quinone soluble therein.

The continuous process of this invention can perhaps best be understood by reference to a diagram and specific examples described in conjunction therewith. In the accompanying diagrammatic drawing reference to some equipment such as pumps, gauges and other equipment which obviously would be necessary to actually operate the process has been intentionally omitted. Only sufficient equipment has been shown to illustrate the process of the invention, and it is intended that no undue limitation be read into the invention by reference to the drawing and the discussion thereof.

The figure of the drawing, thus, is a diagrammatic representation of one embodiment of the continuous process of this invention.

The process will now be described by reference to this figure, anthracene, benzene, and a sodium dichromate-acid solution being employed at atmospheric pressure and at an elevated temperature. An oxidation reactor 12 built to study the continuous oxidation process, is a tubular reactor, closed at one end, and fitted with both an outlet 34a for the sodium dichromate-acid solution and an inlet 11a for the anthracene solution. In addition there is added an overflow outlet 24 near the top of reactor 12 for removal of anthraquinone solution and a control 14 to be used in filling the vessel and controlling flow rates. Contact between the two liquid phases is obtained by a flow of the benzene-anthracene solution upwardly through the more dense acid phase. Due to the dependence of flow on the relative densities (approximately 0.9 g./cm.$^3$ for the benzene solution and 1.4 g./cm.$^3$ for the oxidizing solution), the anthracene solution must be under sufficient pressure by the location of mixer 6 or otherwise so there is no back flow.

To increase contact time and thus to insure better anthracene conversion, the reactor column contains a suitable packing 22 such as Raschig rings, Berl saddles, etc. The column can also be of the type containing suitable mixing devices such as plates or mechanical agitators, e.g., a Scheibel column. Heating or cooling of the reactor and its contents is effected through the use of jacket 20. Anthraquinone solutions withdrawn from the reactor are treated to remove solids, if necessary, and then cooled to promote crystal growth. Crystals are then removed by filtration and the solution containing traces of anthraquinone dissolved therein is recycled to the mixer for reuse. A small amount of the filtrate can then be continuously purified or discarded to prevent the build-up of soluble impurities by means not shown.

Considering now the overall process, benzene from benzene storage 2 and anthracene, previously purified—as by the process of U.S. 3,285,987, filed Feb. 8, 1965—from anthracene storage 4 are heated and mixed in contactor 6 equipped with stirrer 8. The anthracene solution so formed, by means 10, is continuously pumped through line 11 into the lower end of reactor 12, filled to a predetermined level by the use of controlling means 14. The sodium dichromate-sulfuric acid solution is heated in vessel 17 and continuously pumped by means 36 through line 16 from vessel 18 and flows countercurrent to the rising anthracene solution. At the reaction temperature, maintained by heating or cooling means 20, the anthracene-benzene solution passes upwardly through the aqueous oxidizing solution, the packing 22 increasing contact between the two phases. The relative flow rates of anthracene solution and chromic acid, at the chromic acid level as controlled by means 14, determine a contact time such that a solution of anthraquinone is withdrawn from line 24. Since the anthraquinone solution generally will contain traces of polymeric impurities, tars and the like, the solution is conducted to a blotter press 26 for the removal of such impurities. The solution from the blotter filter is then cooled at 28 and passed to a vessel 30. This vessel, equipped with a cooled jacket 31, provides the residence time needed for crystal growth. The solution containing crystals thus grown is subsequently passed to filtering means 32 also maintained at the crystallization temperature and adapted for the continuous removal of product from the organic solvent phase and the recovery of anthraquinone therefrom at 33, the filtrate being recycled to mixer 6 or solvent storage 2. The reduced or spent dichromate solution, continuously withdrawn through line 34, is cooled at 35 and thereafter is regenerated in cells 18 by electrolytic oxidation, as is well known in the art. The regenerated aqueous oxidizing solution is passed continuously to the reactor through line 16 by means 36.

Since the chromic acid oxidation of fused ring hydrocarbons is known, temperatures, chromic ion concentration and the like are well understood. The temperature is desirably in the range of 35° C. to just below the boiling point of the lowest boiling component, usually the solvent, in other words the temperature T is 35° C.$<$T$<$B.P. of solvent. In the process, since flow rates are relative, and depend upon such factors as concentrations of the reactants, reactor size, volume of aqueous phases, temperature and the like only guide lines are set forth herein. In general however, the column of aqueous layer is sufficiently high to provide adequate contact time for substantially complete conversion of the organic reactant. In addition, to insure more complete conversion of the organic reactant, an excess of the compound furnishing the hexavalent chromium ion is employed. Normally, for two equivalents of hexavalent chromium, one equivalent (mol) of the fused ring hydrocarbon is required and solution containing a mol of the quinone is withdrawn, traces of unreacted fused ring hydrocarbon and unrecovered quinone being recycled. Desirably, for $x$ mols of the fused ring hydrocarbon flowing into the reactor at least $3x$ equivalents, preferably $4x$ to $6x$ equivalents of hexavalent chromium are employed. Based on this relationship flow rates can readily be adjusted by one skilled in the art. A higher chromium ion flow rate would require heat removal means readily provided for in this countercurrent continuous process.

EXAMPLE 1

To prepare anthraquinone using the process whose description precedes this example, dissolve sodium dichromate in dilute sulfuric acid to form a 14% solution of $Na_2Cr_2O_7$-$H_2SO_4$. To prevent crystal formation the amount of anthracene dissolved in benzene is based on the solubility of anthraquinone in benzene at 70° C. assuming 100 percent conversion. On this basis, dissolve 1.4 parts by weight of anthracene in benzene per 100 parts by weight of benzene and carry out the described process at 70° C., in a ten foot column having about a seven foot aqueous layer therein, flow rates being an addition and withdrawal of aqueous solution each at 11,400 quarts per hour, and an addition and withdrawal of organic solution each at the rate of 4,010 quarts per hour. Purification of the crude anthraquinone is effected by filtration of the anthraquinone-benzene solution followed by one recrystallization from chlorobenzene. Melting points for two anthraquinone products A and B from benzene cakes obtained from two different commercial sources compare with other commercial anthraquinones C, D, and E as follows.

TABLE 1.—RELATIVE MELTING POINTS

| Samples | Appearance of first liquid (° C.) | Disappearance of last crystals (° C.) |
|---|---|---|
| A | 271.80±0.25 | 274.50±0.00 |
| B | 273.50±0.30 | 274.80±0.30 |
| C | 272.40±0.40 | 272.75±0.75 |
| D | 273.25±0.25 | 274.50±1.00 |
| E | 272.90±0.56 | 276.80±0.70 |

The above column was unpacked, dispersion being obtained with a spray nozzle, but was found to be longer than necessary. Using the oxidation reaction system described, but with a shorter packed column, the chromic-sulfuric acid as the continuous phase and conversions determined by vapor phase chromatography, an investigation of several variables is as follows.

EXAMPLE 2

By varying the sulfuric acid concentration from 30 percent to 55 percent the anthraquinone conversion increases from 7 percent to 92 percent, the other variables being constant: one foot packed (¼ in. Berl saddles) column; room temperature; 0.1 percent anthracene in benzene; and 10.3 weight percent $Na_2Cr_2O_7 \cdot 2H_2O$.

EXAMPLE 3

By varying the sodium dichromate concentration from 3 weight percent to 12 weight percent the conversion increases from 5 percent to 80 percent. Above 12 percent sodium dichromate concentration, the curve levels off and there is no change in conversion between 12 percent and 30.3 percent (saturation), all other variables being kept constant as in Example 2, using 40 percent sulfuric acid.

EXAMPLE 4

The is no noticeable effect of temperature up to 36° C. Above this temperature the conversion increases from 38 percent to 80 percent as the temperature is changed from 36° C. to 70° C.

EXAMPLE 5

With respect to the effect of reactor column length on conversion, up to two feet, there is a rise in conversion from 0 percent to 70 percent. Above this point there is about a 2 percent increase in conversion for every 10-inch increase in column length.

EXAMPLE 6

The quantity of dichromate required for the complete oxidation of anthracene is in excess of theoretical amounts. In the case of a 14 percent sodium dichromate-40 percent sulfuric acid oxidizing solution, dichromate usage is dependent not only upon the purity of the anthracene, but also upon the type of impurity.

EXAMPLE 7

Using room temperature and a 40 percent sulfuric acid-31 percent sodium dichromate solution, conversion obtained on unpacked columns and packed columns (¼ in. Berl saddles) show packed columns to be more effective.

TABLE 2

| Column length (inches) | Conversion (percent) | |
| --- | --- | --- |
| | Unpacked | Packed |
| 10 | 30 | 73 |
| 20 | 44 | 91 |
| 30 | 48 | 95 |
| 40 | 51 | 98 |

In the process of Examples 1 through 7 the aqueous chromic-sulfuric acid solution is in the continuous phase with the organic-benzene solution passing upwardly therethrough. An alternate means, although somewhat less effective, utilizes the anthracene-benzene phase as the continuous phase and the aqueous acid solution passes downwardly through the organic phase.

EXAMPLE 8

The packing in a column with the anthracene-benzene solution as the continuous phase is more critical than when the chromic-sulfuric acid solution is the continuous phase. Without packing there is practically no conversion if the acid is merely allowed to fall through the benzene phase. In a two and one-fourth foot Berl saddle column using a 40 percent sulfuric acid-10.3 percent sodium dichromate soltuion a 92 percent conversion is obtained after equilibrium is reached (about 5 hours).

EXAMPLE 9

Repeat the method of Example 1 but use 1.6 parts by weight of anthracene per 100 parts by weight of chloroform. At a reaction temperature of 55° C. similar results are obtained.

EXAMPLE 10

In Example 1 substitute a mixture of hexane and chloroform for benzene, using 0.6 part anthracene by weight per 100 parts of a 20 percent hexane-80 percent chloroform mixture. A reaction temperature of 49° C. is used to obtain the anthraquinone.

EXAMPLE 11

According to the foregoing examples 2.7 parts by weight of phenanthrene are dissolved in benzene. By reaction with the chromic acid oxidizing solution at 70° C. phenanthraquinone is obtained.

By the method of this invention, since the quinone remains in solution the process can be carried out without the engineering difficulties which are encountered by processes wherein crystal slurries are being handled. In addition a two phase solution system such as employed herein, with the more dense phase aqueous solution falling through the organic phase or the less dense organic phase rising through the aqueous phase, lends itself to much better control for continuous operation. The temperature can be maintained within narrow limits and by adjusting the flow rates and the volume of the continuous phase usually the volume of the aqueous phase or by providing cooling means such as a jacket or internal heat exchange. Contact of reactants is more uniform than would be the case if the aqueous and organic phases were admitted to the reactor concurrently and subjected to vigorous agitation.

The invention thus provides a reliable and efficient process for the oxidation of two, three, and four fused ring hydrocarbons, and variations and modifications will, of course, be obvious to those skilled in the art. For instance, there are many solvents in use in naphthalene, anthracene, phenanthrene, naphthaquinone, anthraquinone, and phenanthraquinone reactions and any of these solvents which are not subject to oxidation under the conditions used can be employed in this continuous process, especially the well known aromatic and aliphatic hydrocarbon solvents. Examples are benzene, nitrobenzene, toluene, chlorobenzene, trichlorobenzene, dichlorobenzene, chloroform, carbon tetrachloride, and mixtures of these alone or with hexane, heptane, pentane, and the like. These and other obvious ramifications will occur to one skilled in the art and therefore they are within the scope of this invention.

What is claimed is:

1. In the process for the manufacture of quinones from polynuclear hydrocarbons wherein the polynuclear hydrocarbon in solution in a solvent therefor is reacted with an aqueous $CrO_3$ solution at a temperature T of $35°$ $C.\leq T<B.P.$ of the lowest boiling component, wherein the polynuclear hydrocarbons are fused ring and substituted fused ring hydrocarbons having two to four fused six-membered rings inclusive and substituents which resist oxidation, and wherein the solvent is selected from the group consisting of aromatic and aliphatic, and nitro and halo substituted aromatic and aliphatic hydrocarbon solvents, the improvement rendering the process continuous despite the fact that organic and aqueous phases must be employed in combination due to differences in solubilities of the reactants, wherein contact between the two liquid phases is obtained by maintaining both components in the liquid phase and passing one solution through the other solution by virtue of their different densities, oxidation occurring during this passage, continuously adding hydrocarbon solution and fresh chromic acid solution for the oxidation of hydrocarbon while continuously removing partially spent oxidizing solution for regeneration, and continuously removing organic solvent containing the quinone in solution therein for quinone recovery.

2. The process of claim 1 wherein the $CrO_3$ oxidizing solution is aqueous sulfuric acid having dissolved therein an oxidizing agent selected from the group consisting of sodium chromate, potassium chromate, sodium dichromate, potassium dichromate and chromium trioxide, and wherein said oxidizing solution flows downwardly through a solution of the polynuclear hydrocarbon.

3. The process of claim 2 wherein the polynuclear hydrocarbon is anthracene.

4. The process of claim 1 wherein the polynuclear hydrocarbon solution flows upwardly through an oxidizing solution of aqueous sulfuric acid having dissolved therein an oxidizing agent selected from the group consisting of sodium chromate, potassium chromate, sodium dichromate, potassium dichromate and chromium trioxide.

5. The process of claim 4 wherein the polynuclear hydrocarbon is anthracene.

6. The process of claim 4 wherein the anthracene is dissolved in benzene in an amount equal to the maximum solubility of anthraquinone in benzene at the reaction temperature and wherein the oxidizing solution is a 20 to 60 percent aqueous sulfuric acid solution containing 5 to 25 percent sodium dichromate.

7. The process of claim 4 wherein the anthracene is dissolved in benzene in an amount equal to the maximum solubility of anthraquinone in benzene at the reaction temperature and wherein the oxidizing solution is a 40 percent potassium dichromate.

8. The process of claim 4 wherein the anthracene is dissolved in nitrobenzene in an amount equal to the maximum solubility of anthraquinone in nitrobenzene at the reaction temperature and wherein the oxidizing solution is a 40 percent potassium dichromate.

9. The process of claim 4 wherein the anthracene is dissolved in a chlorobenzene in an amount equal to the maximum solubility of anthraquinone in the chlorobenzene at the reaction temperature and wherein the oxidizing solution is a 40 percent aqueous sulfuric acid solution containing 10 percent sodium chromate.

10. The process of claim 4 wherein the polynuclear hydrocarbon is phenanthrene.

11. The process of claim 4 wherein addition and removal rates of the reacting solutions are maintained such that the organic phase is one-third to one-half of the total liquid volume, and an amount of naphthalene is maintained in solution in the organic solvent equivalent to the maximum quantity of naphthoquinone soluble therein.

References Cited

UNITED STATES PATENTS

| | | | |
|---|---|---|---|
| 1,303,168 | 5/1919 | Conover | 260—385 |
| 1,467,258 | 9/1923 | Ullrich | 260—385 |
| 2,865,933 | 12/1958 | James et al. | 260—385 |
| 2,821,534 | 1/1958 | Alexander | 260—385 |

LORRAINE A. WEINBERGER, Primary Examiner

L. A. THAXTON, Assistant Examiner

U.S. Cl. X.R.

260—396